United States Patent
Shimotori

(10) Patent No.: US 12,003,006 B2
(45) Date of Patent: Jun. 4, 2024

(54) FUEL CELL SYSTEM AND METHOD FOR CONTROLLING FUEL CELL SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventor: Soichiro Shimotori, Kawasaki Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 848 days.

(21) Appl. No.: 17/115,064

(22) Filed: Dec. 8, 2020

(65) Prior Publication Data

US 2021/0111417 A1  Apr. 15, 2021

Related U.S. Application Data

(63) Continuation of application No. PCT/JP2019/049349, filed on Dec. 17, 2019.

(30) Foreign Application Priority Data

Jan. 8, 2019 (JP) .................. 2019-001333

(51) Int. Cl.
*H01M 8/04029* (2016.01)
*H01M 8/0258* (2016.01)
*H01M 8/0267* (2016.01)
*H01M 8/04007* (2016.01)
*H01M 8/04082* (2016.01)
*H01M 8/04701* (2016.01)
*H01M 8/10* (2016.01)

(52) U.S. Cl.
CPC ..... *H01M 8/04029* (2013.01); *H01M 8/0258* (2013.01); *H01M 8/0267* (2013.01); *H01M 8/04067* (2013.01); *H01M 8/04201* (2013.01); *H01M 8/04701* (2013.01); *H01M 2008/1095* (2013.01)

(58) Field of Classification Search
CPC ........... H01M 8/04029; H01M 8/0258; H01M 8/0267; H01M 8/04067; H01M 8/04201; H01M 8/04701; H01M 2008/1095; H01M 8/04783; H01M 8/0662; H01M 8/04089; H01M 8/04; H01M 8/10; Y02E 60/50
See application file for complete search history.

(56) References Cited

U.S. PATENT DOCUMENTS

| | | | |
|---|---|---|---|
| 5,503,944 A | 4/1996 | Meyer et al. | |
| 7,045,232 B1 | 5/2006 | Duebel et al. | |
| 2008/0160366 A1* | 7/2008 | Allen | H01M 8/04074 429/434 |
| 2020/0091530 A1* | 3/2020 | Yu | H01M 8/04798 |

FOREIGN PATENT DOCUMENTS

| | | | |
|---|---|---|---|
| JP | H11-508726 A | | 7/1999 |
| JP | 2002313379 A | * | 10/2002 |
| JP | 2006-032092 A | | 2/2006 |
| JP | 2017-188226 A | | 10/2017 |

* cited by examiner

*Primary Examiner* — Muhammad S Siddiquee
(74) *Attorney, Agent, or Firm* — Foley & Lardner LLP

(57) ABSTRACT

A fuel cell system according to the present embodiment includes a fuel cell stack, a cooling-water tank having a cooling-water supply port to which a cooling-water supply pipe coupled to a cooling-water inlet manifold is coupled at the other end, a first oxygen-containing-gas discharge pipe coupled at one end to an air outlet manifold being coupled to the cooling-water tank at the other end, the cooling-water tank being configured to supply cooling water from the cooling-water inlet manifold, and a pressure-loss part to which a second oxygen-containing-gas discharge pipe coupled at one end to an air discharge port of the cooling-water tank is coupled at the other end, and to which a fuel-gas discharge pipe coupled at one end to a fuel-outlet manifold provided in a downstream outlet of the fuel-electrode passage is coupled at the other end.

11 Claims, 5 Drawing Sheets ns a fuel cell
FUEL CELL SYSTEM AND METHOD FOR CONTROLLING FUEL CELL SYSTEM

CROSS-REFERENCE TO RELATED APPLICATIONS

This application is a continuation application of International Application No. PCT/JP2019/049349, filed Dec. 17, 2019, which claims priority to Japanese Patent Application No. 2019-001333 filed Jan. 8, 2019. The contents of these applications are incorporated herein by reference in their entirety.

FIELD

Embodiments of the present invention relate to a fuel cell system and a method for controlling a fuel cell system.

BACKGROUND

In a polymer electrolyte fuel cell stack that includes a fuel electrode, a solid polymer electrolyte membrane, an oxidizing electrode, and a separator formed in layers, a fuel gas containing hydrogen is supplied to the fuel electrode, and an oxygen-containing gas that contains oxygen is supplied to the oxidizing electrode, so that electricity is generated by an electrochemical reaction. Meanwhile, the solid polymer electrolyte membrane has such characteristics that its moisture content is changed with an equilibrium vapor pressure, causing change of its resistance. Therefore, in order to reduce the resistance of the electrolyte membrane and obtain sufficient power-generation performance, it is necessary to humidify the solid polymer electrolyte membrane. Commonly known humidification methods are an external humidification method that adds water vapor to a fuel gas and/or an oxidant gas in advance and an internal humidification method that directly adds water via a separator.

Further, cooling is required in order to remove heat generated by a cell reaction. Examples of cooling methods include a method that causes water or air to flow to a cooling plate inserted every plural cells to perform cooling and a method that performs cooling with latent heat of vaporization of water supplied by internal humidification. A humidification method and a cooling method have a close relation. In the external humidification method, a cooling-water passage is inserted every several cells in accordance with the state of heat generation in an operation condition. In the separator, a dense conductive material is used for forming a fuel-gas passage, an oxidant-gas passage, and the cooling-water passage and forms a configuration that can prevent leak. In a case where the passages are provided on both surfaces of this separator, the number of separators is one to two in each cell.

In the method of internal humidification and latent-heat cooling, humidification water is supplied to a gas passage from a cooling-water passage provided on the same separator surface as the gas passage, and cooling is performed with latent heat of vaporization of the humidification water. A dense conductive material is used for the separator to prevent leak. A cooling plate can be omitted, and the number of separators is one per cell. In the external humidification method and the method of internal humidification and latent-heat cooling, water generated by a reaction is recovered as water vapor and is discharged together with an unreacted gas. The vapor pressure in the gas passage becomes high in order to keep the resistance of the electrolyte membrane low, and water is condensed because of use of a dense material for the separator. Therefore, gas diffusion layers in the fuel electrode and the oxidizing electrode are blocked with water, so that gas diffusion is hindered. This phenomenon is called flooding and is one of factors of performance deterioration of a polymer electrolyte fuel cell.

In a humidification and cooling method using a conductive porous plate having fine holes, a cooling-water passage is provided for each cell, and humidification is performed by supplying cooling water to gas passages via the conductive porous plate, in general. In this case, generated water and condensed water are removed through the conductive porous plate. Therefore, the pressures of a fuel gas and an oxidant gas are made higher than the pressure of the cooling water to prevent the gases from leaking, and uniform humidification and cooling are performed in a reaction surface. Further, a pressure adjusting container is provided between an oxidant-gas passage and the cooling-water passage to generate a differential pressure between the oxidant gas and the cooling water when the oxidant gas is pressurized.

However, control of the differential pressure between the oxidant gas and the cooling water requires branch piping for each of the oxidant-gas passage and the cooling-water passage. In addition, the pressure adjusting container is required. Accordingly, a system becomes complicated.

DETAILED DESCRIPTION

Figure 1:
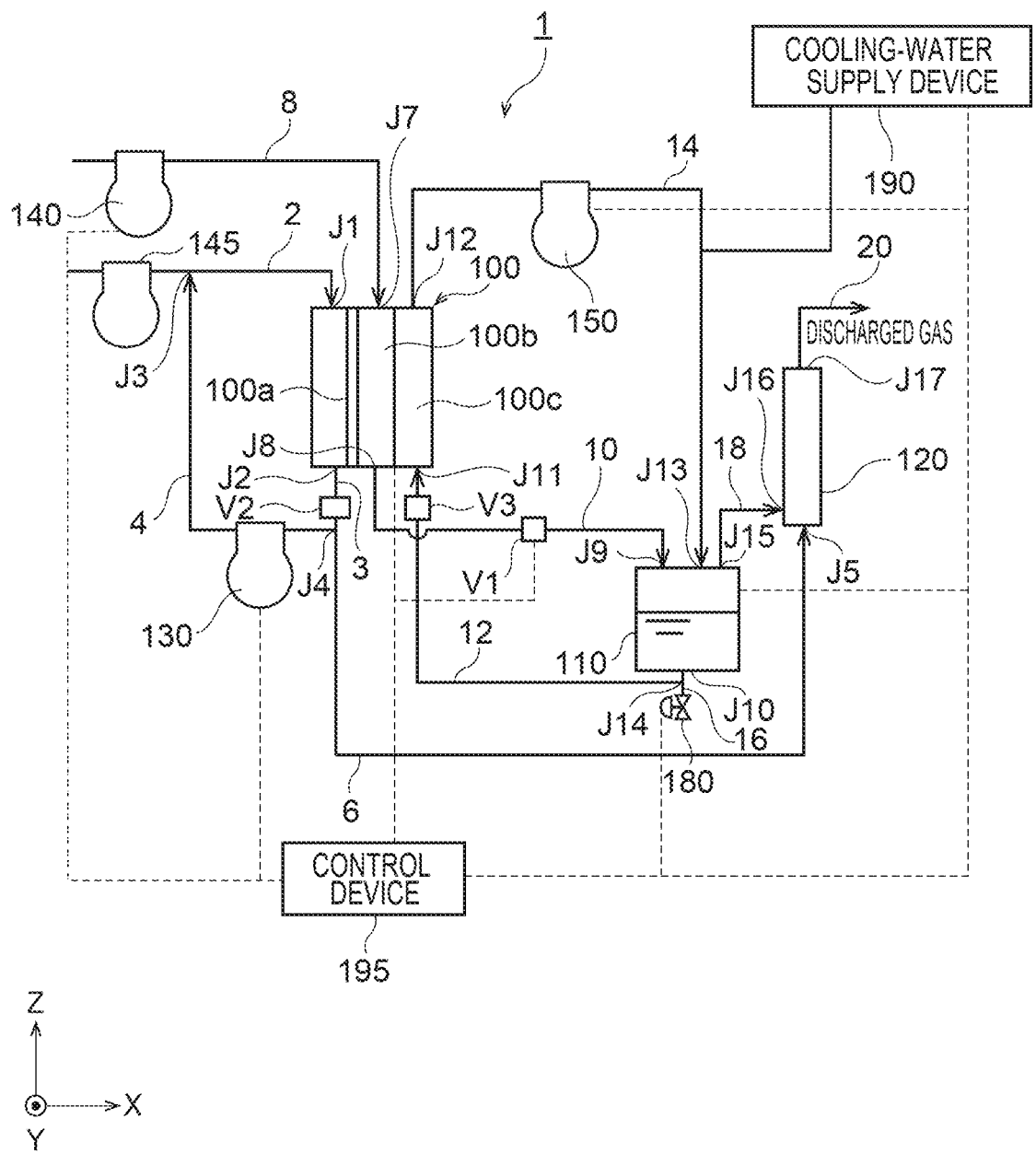
FIG. 1 is an overall schematic configuration diagram of a fuel cell system.

A fuel cell system and a method for controlling a fuel cell system according to embodiments of the present invention will now be explained in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

First, an overall configuration of a fuel cell system 1 is described with reference to FIGS. 1 and 2. FIG. 1 is an overall schematic configuration diagram of the fuel cell system 1. As illustrated in FIG. 1, the fuel cell system 1 is a system capable of reusing an anode off-gas to be discharged from a fuel electrode of a fuel cell during power generation, and is configured to include a fuel-gas supply pipe 2, fuel-gas discharge pipes 3 and 6, a fuel-gas recycle pipe 4, an oxygen-containing-gas supply pipe 8, a first oxygen-containing-gas discharge pipe 10, a cooling-water supply pipe 12, a cooling-water discharge pipe 14, an impounded-water discharge pipe 16, a second oxygen-containing-gas discharge pipe 18, an external discharge pipe 20, a fuel cell stack 100, a cooling-water tank 110, a pressure-loss part 120, a first supply part 130, a second supply part 140, a third supply part 145, a discharge part 150, a discharge valve 180, a cooling-water supply device 190, and a control device 195. FIG. 1 further illustrates air-pressure measurement instruments V1 and V2 and a water-pressure measurement instrument V3.

Figure 2:
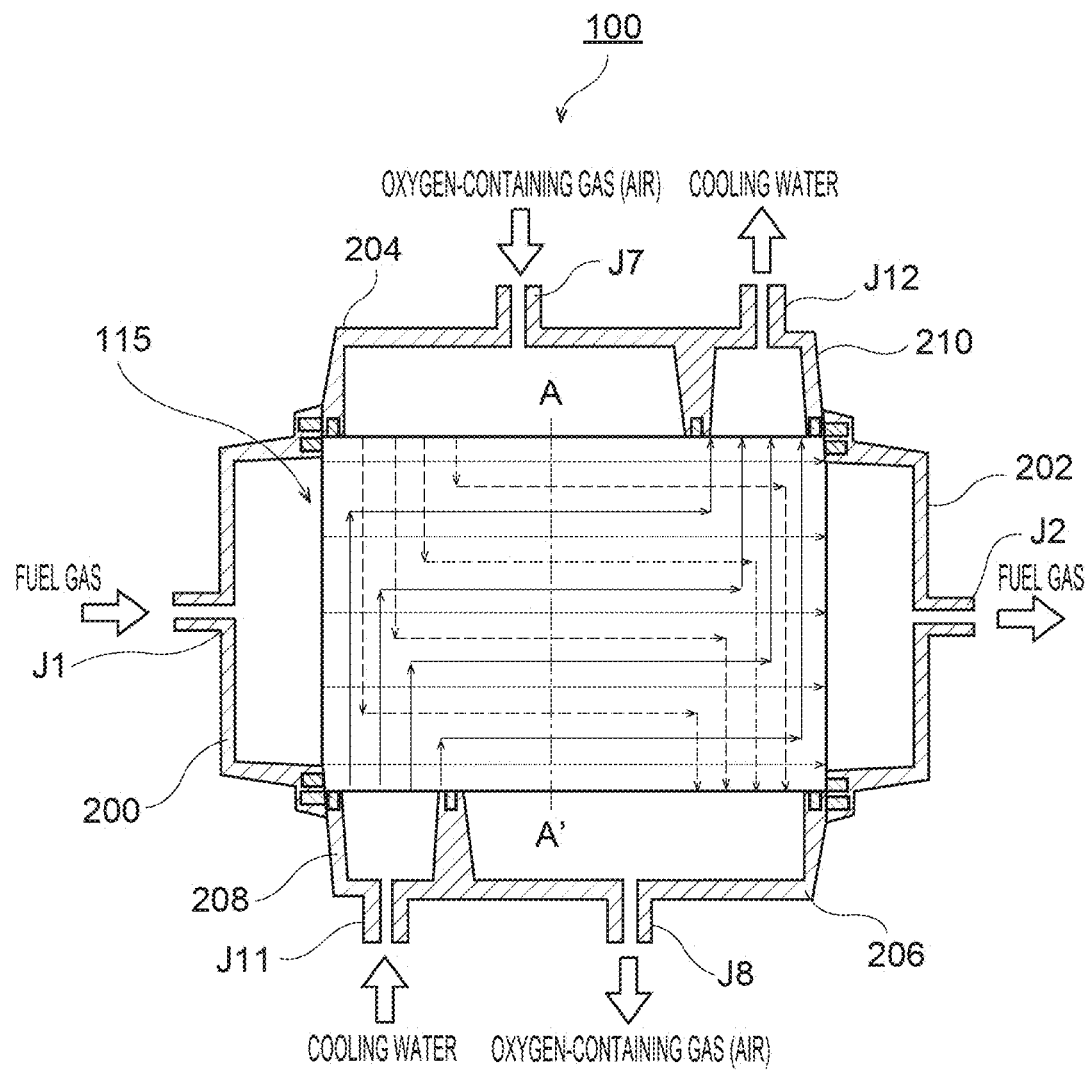
FIG. 2 is a top view illustrating an internal structure of a fuel cell stack of a solid polymer type.

FIG. 2 is a top view illustrating an internal structure of the fuel cell stack 100 of a solid polymer type. As illustrated in FIG. 2, the fuel cell stack 100 includes a fuel cell 115, a fuel inlet manifold 200, a fuel outlet manifold 202, an air inlet manifold 204, an air outlet manifold 206, a cooling-water inlet manifold 208, and a cooling-water outlet manifold 210. The fuel cell 115 is an electromotive portion and its detailed configurations will be described later. As described above, the fuel inlet manifold 200, the fuel outlet manifold 202, the air inlet manifold 204, the air outlet manifold 206, the cooling-water inlet manifold 208, and the cooling-water outlet manifold 210 are provided around the fuel cell 115.

The fuel-gas supply pipe 2 is connected to an inlet 31 of the fuel inlet manifold 200 of the fuel cell stack 100. A hydrogen-containing gas is supplied to the fuel-gas supply pipe 2 as a fuel gas. Accordingly, the fuel-gas supply pipe 2 configures a fuel-gas passage that supplies the fuel gas to a fuel-electrode passage 100a of the fuel cell stack 100.

The fuel-gas discharge pipes 3 and 6 are connected to an outlet J2 of the fuel outlet manifold 202 of the fuel cell stack 100 at one end and to an inlet J5 of the pressure-loss part 120 via a branching portion J4 at the other end. That is, the fuel-gas discharge pipe 3 is a fuel-gas discharge pipe from the outlet J2 of the fuel outlet manifold 202 to the branching portion J4, and the fuel-gas discharge pipe 6 is a fuel-gas discharge pipe from the branching portion J4 to the inlet J5 of the pressure-loss part 120. These fuel-gas discharge pipes 3 and 6 configure a fuel-gas discharge passage that discharges an anode off-gas.

The fuel-gas recycle pipe 4 is connected to the branching portion J4 between the fuel-gas discharge pipes 3 and 6 and to a junction J3 of the fuel-gas supply pipe 2 at the other end. The fuel-gas recycle pipe 4 recirculates the anode-off gas discharged from the fuel-electrode passage 100a of the fuel cell stack 100, via the junction J3 of the fuel-gas supply pipe 2. Accordingly, the fuel-gas recycle pipe 4 configures a fuel-gas recycle passage that recirculates the anode-off gas via the junction J3 of the fuel-gas supply pipe 2.

The oxygen-containing-gas supply pipe 8 is connected to an inlet J7 of the air inlet manifold 204 of the fuel cell stack 100. For example, air is supplied as an oxygen-containing gas to the oxygen-containing-gas supply pipe 8. Accordingly, the oxygen-containing-gas supply pipe 8 configures an oxygen-containing-gas supply passage that supplies the oxygen-containing gas to an oxidizing-electrode passage of the fuel cell stack 100.

The first oxygen-containing-gas discharge pipe 10 is connected to an outlet J8 of the air outlet manifold 206 of the fuel cell stack 100 at one end and to a first inlet J9 of the cooling-water tank 110 at the other end. This first oxygen-containing-gas discharge pipe 10 configures a first oxygen-containing-gas discharge passage that discharges a cathode-off gas from the oxidizing-electrode passage 100b of the fuel cell stack 100 to the cooling-water tank 110.

The cooling-water supply pipe 12 is coupled to a cooling-water supply port J10 of the cooling-water tank 110 at one end and to an inlet of the cooling-water inlet manifold 208 provided on an upstream side of a cooling-water passage 100c of the fuel cell stack 100 at the other end. This cooling-water supply pipe 12 configures a cooling-water supply passage that supplies cooling water from the cooling-water tank 110 to the inlet J11 of the cooling-water inlet manifold 208. The cooling-water supply port J10 is provided in a bottom surface of the cooling-water tank 110.

The cooling-water discharge pipe 14 is coupled to an outlet J12 of the cooling-water outlet manifold 210 of the fuel cell stack 100 at one end and to a second inlet J13 of the cooling-water tank 110 at the other end. This cooling-water discharge pipe 14 configures a cooling-water discharge passage that discharges cooling water from the cooling-water outlet manifold 210 to the cooling-water tank 110.

The impounded-water discharge pipe 16 is coupled to a branching portion J14 of the cooling-water discharge pipe 14 at one end and discharges a portion of cooling water impounded in the cooling-water tank 110. That is, the impounded-water discharge pipe 16 is provided with the opening/closing valve 180, and a portion of the cooling water is discharged when the valve is open. This impounded-water discharge pipe 16 configures an impounded-water discharge passage that discharges the cooling water from the cooling-water tank 110.

The second oxygen-containing-gas discharge pipe 18 is connected to an air discharge port J15 of the cooling-water tank 110 at one end and to a second inlet J16 of the pressure-loss part 120 at the other end. This second oxygen-containing-gas discharge pipe 18 configures a second oxygen-containing-gas discharge passage that discharges the cathode-off gas from the cooling-water tank 110 to the pressure-loss part 120.

The external discharge pipe 20 is connected to a discharge part J17 of the pressure-loss part 120 at one end, and discharges the anode-off gas supplied from the fuel-gas discharge pipe 6 and the cathode-off gas supplied from the second oxygen-containing-gas discharge pipe 18. The external discharge pipe 20 configures an external discharge passage that discharges the anode off-gas and the cathode-off gas.

The fuel cell stack 100 includes therein the fuel-electrode passage 100a that supplies a hydrogen-containing gas to the fuel electrode, the oxidizing-electrode passage 100b that supplies an oxygen-containing gas to the oxidizing electrode, and the cooling-water passage 100c that cools the fuel cell stack 100, and generates power by using the hydrogen-containing gas to be supplied to the fuel electrode and the oxygen-containing gas to be supplied to the oxidizing electrode. The anode off-gas is a gas discharged from the fuel-electrode passage 100a during power generation of the fuel cell stack 100, and contains an unreacted fuel gas. The cathode-off gas is a gas discharged from the oxidizing-electrode passage 100b during power generation of the fuel cell stack 100.

As illustrated in FIG. 2, the fuel inlet manifold 200 and the fuel outlet manifold 202 communicate with the fuel-electrode passage 100a. That is, a fuel gas supplied through the inlet J1 of the fuel inlet manifold 200 flows through the fuel-electrode passage 100a illustrated with a dotted line and is discharged through the outlet J2 of the fuel outlet manifold 202.

The air inlet manifold 204 and the air outlet manifold 206 communicate with the oxidizing-electrode passage 100b. That is, an oxygen-containing gas supplied through the inlet J7 of the air inlet manifold 204 flows through the oxidizing-electrode passage 100b illustrated with a broken line and is discharged through the outlet J8 of the air outlet manifold 206.

The cooling-water inlet manifold 208 and the cooling-water outlet manifold 210 communicate with the cooling-water passage 100c. That is, cooling water supplied through the inlet J11 of the cooling-water inlet manifold 208 flows through the cooling-water passage 100c illustrated with a solid line and is discharged through the outlet J12 of the cooling-water outlet manifold 210.

Each of the manifolds 200, 202, 204, 206, 208, and 210 has to have gas impermeability and electrical insulation, and is usually manufactured by compression molding or injection molding of thermoplastic resin or thermosetting resin with a mold. An example of thermoplastic resin used in this manufacturing is polyphenylene sulfide (PPS), and examples of thermosetting resin are epoxy resin and phenol resin. Each manifold has a box shape that is open toward the fuel cell 115, and a side surface and an inner surface of each manifold have a draft taper from the fuel cell 115 side toward the bottom of the manifold. This draft taper ensures releasability from a mold.

A sealing groove having a rectangular cross-section is provided in a sealing surface of a peripheral portion of each manifold, which is in contact with a side surface of the fuel cell 115, along the entire circumference of the peripheral portion. A sealing member is inserted in the sealing groove, thereby preventing a gas/cooling water from leaking. Detailed configurations of the fuel cell stack 100 will be described later.

As illustrated in FIG. 1, the first oxygen-containing-gas discharge pipe 10, the cooling-water supply pipe 12, the cooling-water discharge pipe 14, and the second oxygen-containing-gas discharge pipe 18 are connected to the cooling-water tank 110. That is, the cooling-water tank 110 is coupled at the inlet J9 to the other end of the first oxygen-containing-gas discharge pipe 10 that is coupled at one end to the outlet J8 of the air outlet manifold 206 provided on the downstream side of the oxidizing-electrode passage 100b, and is coupled at the inlet J13 to the other end of the cooling-water discharge pipe 14 that is coupled at one end to the outlet J12 of the cooling-water outlet manifold 210 provided on the downstream side of the cooling-water passage 100c. Also, the other end of the cooling-water supply pipe 12 that is coupled at one end to the inlet J11 of the cooling-water inlet manifold 208 provided on the upstream side of the cooling-water passage 100c is coupled to the cooling-water supply port J10. Accordingly, the water-pressure in the cooling-water inlet manifold 208 of the fuel cell stack 100 is adjusted to be equal to or lower than the air-pressure in the air outlet manifold 206 because of the cooling-water tank 110 and the configurations of these pipes 10, 12, and 14. Further, the cooling-water tank 110 can receive supply of cooling water from the cooling-water supply device 190. Accordingly, it is possible to increase the amount of impounded water in the cooling-water tank 110.

The other end of the second oxygen-containing gas discharge pipe 18 that is coupled at one end to the air discharge port J15 of the cooling-water tank 110 is coupled to the pressure-loss part 120. Further, the other end of the fuel-gas discharge pipe 6 that is coupled at one end to the outlet J2 of the fuel outlet manifold 202 provided on the downstream side of the fuel-electrode passage 100a is coupled to the pressure-loss part 120. This pressure-loss part 120 adjusts the air-pressures in the first oxygen-containing-gas discharge pipe 10, the cooling-water tank 110, and the second oxygen-containing-gas discharge pipe 18, and the air-pressure in the fuel-gas discharge pipe 6. The pressure-loss part 120 may be configured by any one of a heat exchanger, a sound absorbing duct, and a catalytic combustor, for example. The details of the pressure-loss part 120 will be described later. The fuel-gas discharge pipe 6 and the second oxygen-containing-gas discharge pipe 18 may be coupled to the pressure-loss part 120 after being merged together. In this case, the pressure-loss part 120 includes up to a junction of the fuel-gas discharge pipe 6 and the second oxygen-containing-gas discharge pipe 18.

The first supply part 130 is, for example, a recycle blower and is provided in the fuel-gas recycle pipe 4 on the downstream side of the branching portion J4 in the fuel-gas recycle pipe 4. This first supply part 130 discharges the anode off-gas from the downstream side of the fuel electrode and discharges it to the downstream side of the first supply part 130 in the fuel-gas discharge pipe 6.

The second supply part 140 is, for example, a compressor and is provided in the oxygen-containing-gas supply pipe 8 on the upstream side of the inlet J7 of the air inlet manifold 204. This second supply part 140 supplies the oxygen-containing gas from the upstream side of the oxidizing electrode. Accordingly, the air-pressure of the oxidant gas is reduced as the oxidant gas passes through passages of the oxygen-containing-gas supply pipe 8, the oxidizing-electrode passage 100b, the first oxygen-containing-gas discharge pipe 10, the cooling-water tank 110, the second oxygen-containing-gas discharge pipe 18, the pressure-loss part 120, and the external discharge pipe 20 to the downstream side. That is, the air-pressure in the air outlet manifold 206 is lower than the air-pressure in the air inlet manifold 204, and the air-pressure in the oxidizing-electrode passage 100b is reduced toward the downstream side. Similarly, the air-pressure in the cooling-water tank 110 is lower than the air-pressure in the air outlet manifold 206.

The third supply part 145 is, for example, a compressor and is provided in the fuel-gas supply pipe 2 on the upstream side of the inlet J1 of the fuel inlet manifold 200. This third supply part 145 supplies the fuel gas from the upstream side of the fuel electrode. Accordingly, the air-pressure of the fuel gas is reduced as the fuel gas passes through passages of the fuel-gas supply pipe 2, the fuel-electrode passage 100a, the fuel-gas discharge pipes 3 and 6, the pressure-loss part 120, and the external discharge pipe 20 to the downstream side. That is, the air-pressure in the fuel outlet manifold 202 is lower than the air-pressure in the fuel inlet manifold 200, and the air-pressure in the fuel-electrode passage 100a is reduced toward the downstream side. Similarly, the pressure in the pressure-loss part 120 is lower than the air-pressure in the fuel outlet manifold 202.

The discharge part 150 is, for example, a cooling-water pump and is provided in the cooling-water discharge pipe 14 on the downstream side of the outlet J12 of the cooling-water outlet manifold 210. Accordingly, the discharge part 150 discharges cooling water on a side close to the cooling-water passage 100c in the cooling-water discharge pipe 14 toward the cooling-water tank 110. In this manner, cooling water is discharged by the discharge part 150 through the outlet J12 of the cooling-water outlet manifold 210. Accordingly, the water-pressure of the cooling water discharged from the discharge part 150 is reduced as the cooling water flows to the downstream side of the discharge part 150. That is, the pressure in the inlet J11 of the cooling-water inlet manifold 208 is lower than the pressure in the cooling-water tank 110. Similarly, the water-pressure of cooling water in the cooling-water passage 100c of the fuel cell stack 100 is reduced as it flows to the downstream side of the cooling-water passage 100c.

As described above, the pressure in the cooling-water tank 110 is lower than the air-pressure in the air outlet manifold 206. Meanwhile, the water-pressure in the inlet J11 of the cooling-water inlet manifold 208 is lower than the pressure in the cooling-water tank 110. From these relations, with respect to the pressure in the cooling-water tank 110 as a reference, the water-pressure in the inlet J11 of the cooling-water inlet manifold 208 is always lower than the air-pressure in the outlet J8 of the air outlet manifold 206. Accordingly, the water-pressure in the cooling-water passage 100c is always kept lower than the air-pressure in the oxidizing-electrode passage 100b. Further, the water-pressure in the cooling-water inlet manifold 208 and the air-pressure in the air outlet manifold 206 are increased and decreased by increase and decrease of the pressure in the cooling-water tank 110, with a differential pressure therebetween being maintained. Accordingly, the operating pressure of the fuel cell stack 100 can be adjusted by increase and decrease of the pressure in the cooling-water tank 110. Here, the operating pressure means the pressures in the fuel-electrode passage 100a and in the oxidizing-electrode passage 100b during power generation of the fuel cell stack 100. That is, the operating pressure means the pressure of a reaction gas during power generation of the fuel cell stack 100.

Meanwhile, since the cooling-water discharge pipe 14 is connected to the cooling-water tank 110, the pressure decrease in the cooling-water passage 100c becomes larger when the discharge amount of cooling water from the discharge part 150 is increased, assuming that the pressure in the cooling-water tank 110 is constant. Therefore, the pressure in the cooling-water manifold inlet 208 is decreased more. Accordingly, a differential pressure between the water-pressure in the cooling-water inlet manifold 208 and the air-pressure in the air outlet manifold 206 can be adjusted.

An operation of the pressure-loss part 120 is described here. The pressure in the cooling-water tank 110 is increased by the pressure-loss part 120, and the water-pressure in the cooling-water inlet manifold 208 and the air-pressure in the air outlet manifold 206 are increased with a differential pressure therebetween being maintained. Further, the air-pressure in the fuel outlet manifold 202 becomes higher than the pressure in the pressure-loss part 120. Therefore, the air-pressure in the fuel outlet manifold 202 becomes higher than the water-pressure in the cooling-water inlet manifold 208. Accordingly, the air-pressure in the fuel-electrode passage 100a is always kept higher than the water-pressure in the cooling-water passage 100c. As described above, it is possible to prevent flooding by always keeping the water-pressure in the cooling-water passage 100c lower than the air-pressure in the fuel-electrode passage 100a and the pressure in the oxidizing-electrode passage 100b by means of the cooling-water tank 110 and the pressure-loss part 120.

The discharge valve 180 is controlled by the control device 195 to open and close the impounded-water discharge pipe 16 that adjusts the amount of impounded water in the cooling-water tank 110.

The cooling-water supply device 190 supplies cooling water through the cooling-water discharge pipe 14.

The air-pressure measurement instrument V1 measures the air-pressure in the first oxygen-containing-gas discharge pipe 10. The air-pressure measurement instrument V2 measures the air-pressure in the fuel-gas discharge pipe 3. The water-pressure measurement instrument V3 measures the water-pressure in the cooling-water supply pipe 12.

The control device 195 controls the entire fuel cell system 1. The control device 195 is, for example, a microcomputer provided with a CPU (Central Processing Unit), a storage device, an input/output device, and the like. The control device 195 executes control in accordance with a program stored in the storage device. The control device 195 controls the second supply part 140, the discharge part 150, the discharge valve 180, and the cooling-water supply device 190 based on signals from the air-pressure measurement instrument V1 and the water-pressure measurement instrument V3. The control device 195 also controls the first supply part 130 to control the recycle flow rate in the fuel-gas recycle pipe 4.

Figure 3:
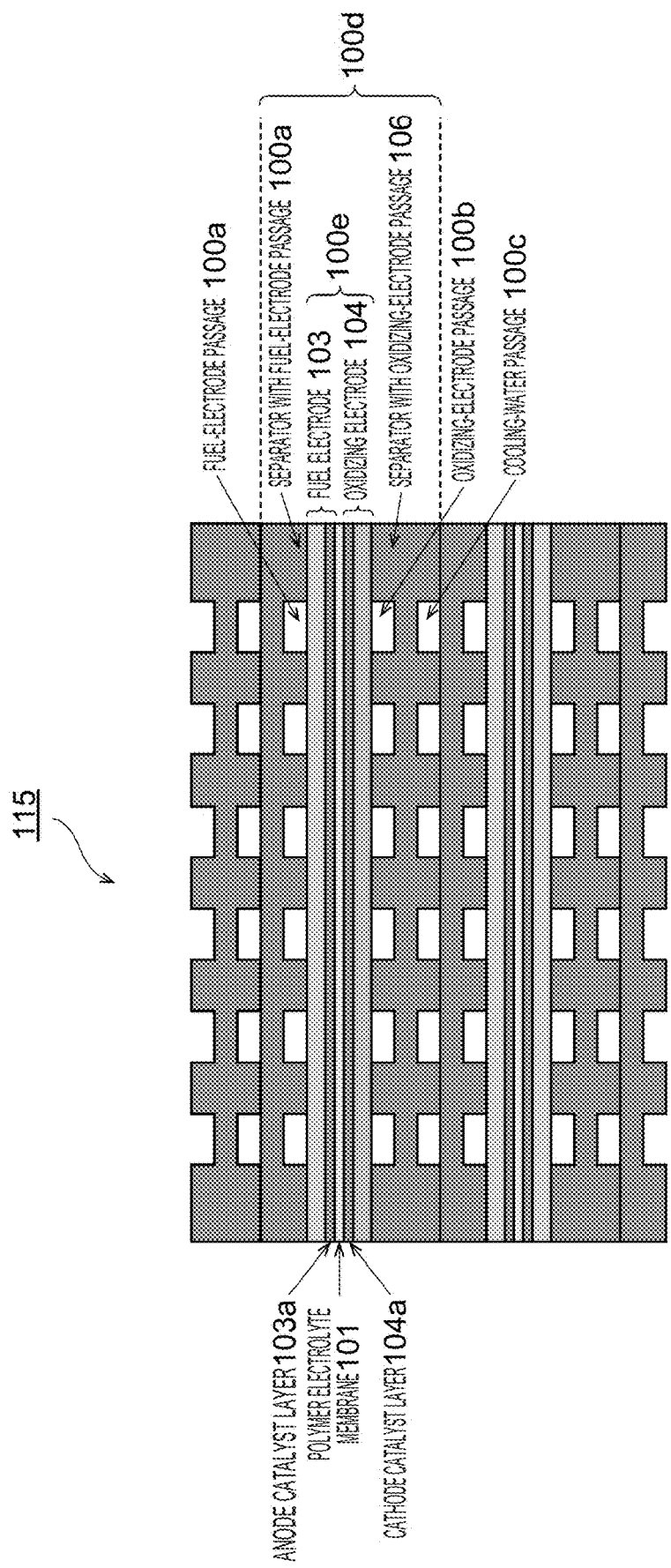
FIG. 3 is a diagram schematically illustrating an A-A' cross-section in FIG. 2.

Detailed configurations of the fuel cell stack 100 are described here with reference to FIG. 3. FIG. 3 is a diagram schematically illustrating an A-A' cross-section in FIG. 2. The fuel cell 115 is configured by a stack of a plurality of unit cells 100d, as illustrated in FIG. 3. This unit cell 100d includes a membrane electrode assembly 100e, a separator with a fuel-electrode passage 105, and a separator with an oxidizing-electrode passage 106.

The membrane electrode assembly 100e includes a solid polymer electrolyte membrane 101, a fuel electrode (an anode) 103 arranged on one surface of the solid polymer electrolyte membrane, and an oxidizing electrode (a cathode) 104 arranged on the opposite surface of the solid polymer electrolyte membrane to the fuel electrode 103. Further, the fuel electrode 103 includes an anode catalyst layer 103a, and the oxidizing electrode 104 includes a cathode catalyst layer 104a.

The separator with a fuel-electrode passage 105 has the fuel-electrode passage 100a formed therein. The separator with an oxidizing-electrode passage 106 has the oxidizing-electrode passage 100b and the cooling-water passage 100c formed therein. Accordingly, the cooling-water passage 100c is in contact with the fuel-electrode passage 100a and the oxidizing-electrode passage 100b via a separator. Although the cooling-water passage 100c is provided in the separator with an oxidizing-electrode passage 106 in the present embodiment, the configuration is not limited thereto. The cooling-water passage 100c may be provided in the separator with a fuel-electrode passage 105. Alternatively, a separator for the cooling-water passage 100c may be provided separately from the separator with an oxidizing-electrode passage 106 and the separator with a fuel-electrode passage 105. Further, although the separator with a fuel-electrode passage 105 and the separator with an oxidizing-electrode passage 106 are independent of each other in the present embodiment, they may be integrated with each other.

These unit cells 100d generate power by reactions represented by Chemical formula 1. A hydrogen-containing gas flows through the fuel-electrode passage 100a on the fuel electrode 103 side to cause a fuel-electrode reaction. An oxygen-containing gas flows through the oxidizing-electrode passage 100b on the oxidizing electrode 104 side to cause an oxidizing-electrode reaction. The fuel cell stack 100 uses these electrochemical reactions to take out an electric energy from the electrodes.

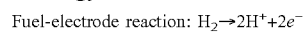
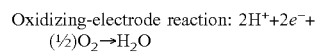

Fuel-electrode reaction: $H_2 \rightarrow 2H^+ + 2e^-$

Oxidizing-electrode reaction: $2H^+ + 2e^- + (1/2)O_2 \rightarrow H_2O$ (Chemical formula 1)

One performance of the fuel cell stack 100 is represented by the current-voltage characteristics. An actual voltage of the fuel cell stack 100 when a predetermined current flows is lower than a theoretical value. It is considered that one cause of this voltage drop is a diffusion overvoltage caused by water generated in supply of reaction gases or in a battery reaction. When water is generated in the electrochemical reactions of hydrogen and oxygen in the unit cell 100*d* and fills in fine pores in a gas diffusion layer in an electrode forming member, the diffusibility of the reaction gas is reduced, causing increase of the diffusion overvoltage.

Therefore, the separator with a fuel-electrode passage 105 and the separator with an oxidizing-electrode passage 106 according to the present embodiment are configured by porous separators. For example, the separator with a fuel-electrode passage 105 and the separator with an oxidizing-electrode passage 106 are formed of porous carbon. These separators can contain water required for humidifying an electrolyte membrane in pores. Further, by keeping the pressure in the cooling-water passage 100*c* lower than the pressure in the fuel-electrode passage 100*a* and the pressure in the oxidizing-electrode passage 100*b*, water generated by the reactions at the electrodes can be absorbed to the cooling-water passage 100*c* through the separators, so that flooding on a gas downstream side can be prevented. Accordingly, increase of the diffusion overvoltage can be prevented. The porous separator may be formed of metal oxide.

A control example by the control device 195 is described here. First, a flow of an oxygen-containing gas is described. The second supply part 140 is controlled by the control device 195 to supply an oxygen-containing gas to the oxidizing-electrode passage 100*b* of the fuel cell stack 100 through the oxygen-containing-gas supply pipe 8. The oxygen-containing gas that has entered into the oxidizing-electrode passage 100*b* is supplied to the oxidizing electrode 104 of each unit cell 100*d*. A portion of the oxygen-containing gas that has reached the oxidizing electrode 104 receives protons and electrons discharged from the fuel electrode and generates water, as represented by Chemical formula 1 described above. A cathode-off gas discharged from the first oxygen-containing-gas discharge pipe 10 is then supplied to the cooling-water tank 110. The cathode-off gas supplied to the cooling-water tank 110 is then supplied to the pressure-loss part 120 through the second oxygen-containing-gas discharge pipe 18. The pressure in the cooling-water tank 110 is adjusted by pressure loss in the pressure-loss part 120.

In this case, a differential pressure between the water-pressure in the cooling-water passage 100*c* and the water-pressure in the oxidizing-electrode passage 100*b* is controlled by adjustment of the discharge amount of cooling water from the discharge part 150 based on measured values of the air-pressure measurement instrument V1 and the water-pressure measurement instrument V3.

Next, a flow of a hydrogen-containing gas is described. A hydrogen-containing gas is supplied to the fuel-electrode passage 100*a* of the fuel cell stack 100 through the fuel-gas supply pipe 2 by control of the control device 195. The hydrogen-containing gas that has entered into the fuel-gas supply pipe 2 is supplied to the fuel electrode 103 of each unit cell 100*d*. A portion of the hydrogen-containing gas that has reached the fuel electrode 103 causes the fuel electrode 103 to generate protons and electrons, as represented by Chemical formula 1 described above. Surplus hydrogen-containing gas that has not been used in power generation is discharged from an outlet of the fuel-electrode passage 100*a* of the fuel cell stack 100 to the fuel-gas recycle pipe 4 as an anode off-gas. The fuel-gas recycle pipe 4 recirculates the anode-off gas discharged from the fuel-electrode passage 100*a*, via the junction J3 of the fuel-gas supply pipe 2. At this time, the first supply part 130 is controlled by the control device 195 to discharge the anode off-gas to the downstream side of the first supply part 130 in the fuel-gas recycle pipe 4.

Next, a flow of a portion of an anode off-gas to be discharged from the fuel-gas discharge pipe 6 is described. A portion of the anode off-gas to be discharged from the fuel-gas discharge pipe 6 is discharged via the pressure-loss part 120. The pressure in the fuel-electrode passage 100*a* is adjusted by pressure loss in the pressure-loss part 120.

Next, a flow of cooling water to be supplied from the cooling-water tank 110 to the cooling-water passage 100*c* in the fuel cell stack 100 is described. A portion of the cooling water supplied from the cooling-water tank 110 to the cooling-water passage 100*c* in the fuel cell stack 100 is supplied via the separator with a fuel-electrode passage 105 and the separator with an oxidizing-electrode passage 106 and is used for humidifying the membrane electrode assembly 100*e*.

Also, the cooling water in the cooling-water passage 100*c* is discharged by the discharge part 150 through the cooling-water discharge pipe 14 to the cooling-water tank 110. Since the water pressure in the cooling-water passage 100*c* is kept lower than the pressure in the fuel-electrode passage 100*a* and the pressure in the oxidizing-electrode passage 100*b* at this time, water generated by the reactions at the electrodes is absorbed to the cooling-water passage 100*c* through the separator with a fuel-electrode passage 105 and the separator with an oxidizing-electrode passage 106. Accordingly, there is no generated water on the downstream side of the fuel-electrode passage 100*a* and the oxidizing-electrode passage 100*b*, so that flooding is prevented.

Figure 4:
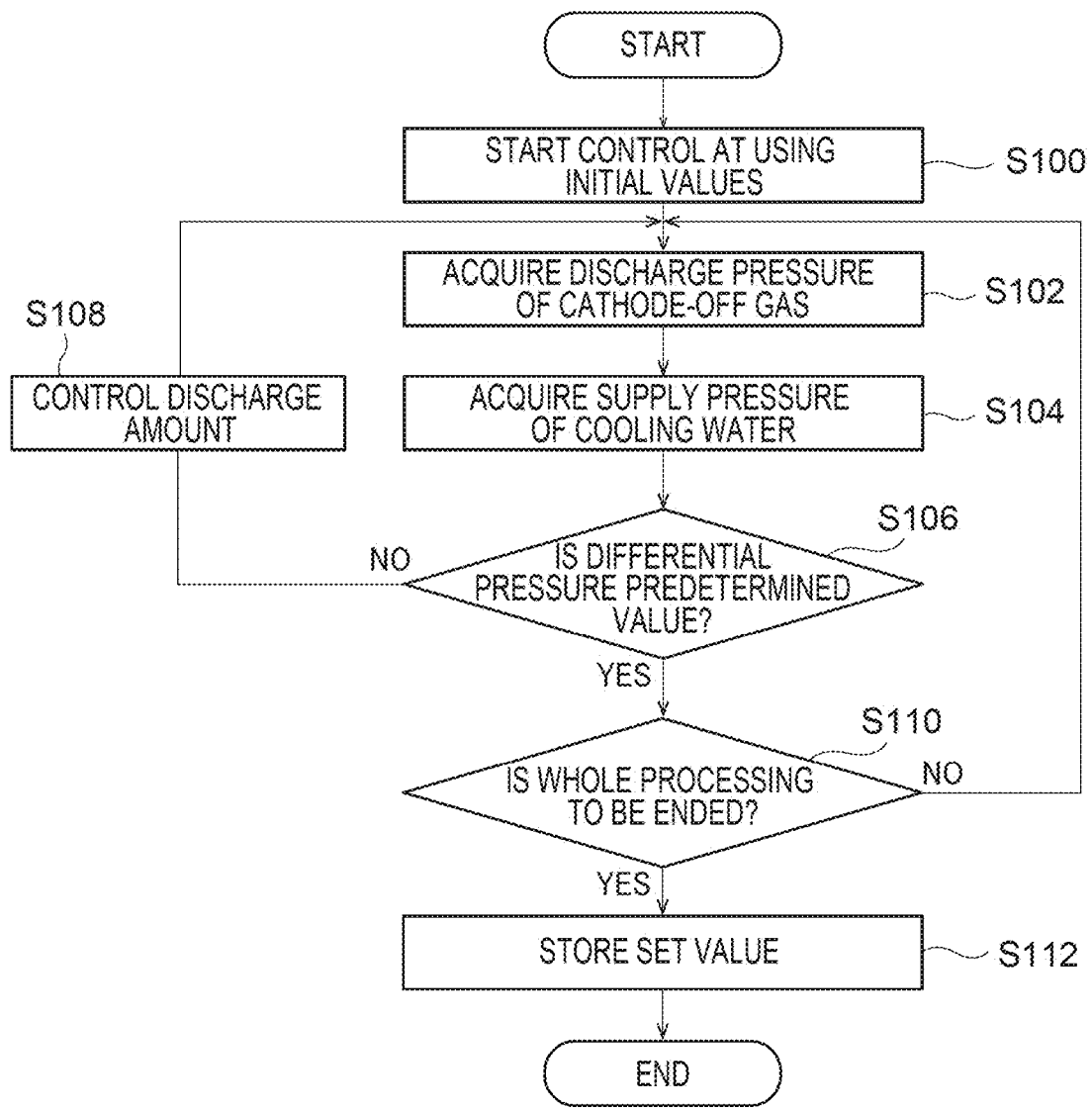
FIG. 4 is a flowchart illustrating a control example in a fuel cell system according to a first embodiment.

FIG. 4 is a flowchart illustrating a control example in the fuel cell system 1 according to the first embodiment. Here, an example of controlling the discharge amount of the discharge part 150 after the supply amount of the second supply part 140 and the discharge part 150 are adjusted to predetermined values is described.

First, the control device 195 starts control for the supply amount of the second supply part 140 and the discharge amount of the discharge part 150 by using initial values stored in a storage device (Step S100).

Next, the control device 195 acquires a measured value of the air-pressure measurement instrument V1 (Step S102). Accordingly, the air-pressure in the air outlet manifold 206 is acquired.

Next, the control device 195 acquires a measured value of the water-pressure measurement instrument V3 (Step S104). Accordingly, the water-pressure in the cooling-water inlet manifold 208 is acquired.

Next, the control device 195 determines whether a differential pressure between the air-pressure in the outlet J8 of the air outlet manifold 206 and the water-pressure in the inlet J11 of the cooling-water inlet manifold 208 is a predetermined value (Step S106). If the differential pressure is not the predetermined value (NO at Step S106), the control device 195 increases the discharge amount of the discharge part 150 by a predetermined amount when increasing the differential pressure. On the contrary, the control device 195 decreases the discharge amount by a predetermined amount when decreasing the differential pressure (Step S108), and continues the processes from Step S102.

Meanwhile, if the differential pressure is the predetermined value (YES at Step S106), the control device 195 determines whether to end the whole processing (Step S110). If the whole processing is not to be ended (NO at Step S110), the processes from Step S102 are repeated. Even though the discharge amount of the discharge part 150 is adjusted, the air-pressure in the outlet J8 of the air outlet manifold 206 is always kept higher than the water-pressure in the inlet J11 of the cooling-water inlet manifold 208 by operations of the cooling-water tank 100 and the configurations of the pipes 10, 12, and 14, and the like.

Meanwhile, if the whole processing is to be ended (YES at Step S110), the control device 195 stores a control value for the second supply part 140 and a control value for the discharge part 150 in the storage device (Step S112) and ends the whole processing.

As described above, a differential pressure between the water-pressure of cooling water supplied from the cooling-water tank 100 to an inlet of the cooling-water passage 100c and the air-pressure in a discharge part of the oxidizing-electrode passage 100b is adjusted by adjustment of the discharge amount of the discharge part 150. Accordingly, it is possible to adjust the differential pressure between the water-pressure in the cooling-water passage 100c and the air-pressure in the oxidizing-electrode passage 100b only by adjustment of the discharge amount of the discharge part 150.

As described above, according to the present embodiment, the other end of the cooling-water supply pipe 12 coupled to the cooling-water inlet manifold 208 is coupled to the cooling-water supply port J10, the other end of the first oxygen-containing-gas discharge pipe that is coupled at one end to the air outlet manifold 206 is coupled to the cooling-water tank 110, and the other end of the second oxygen-containing-gas discharge pipe 18 coupled at one end to the air discharge port J15 of the cooling-water tank 110 and the other end of the fuel-gas discharge pipe 6 that is coupled at one end to the fuel outlet manifold 202 provided at a downstream outlet of the fuel-electrode passage 100a are merged together. With this configuration, it is possible to appropriately control a differential pressure between pressures of both an anode-off gas and a cathode-off gas and cooling water without an additional pipe or device. Further, the other end of the second oxygen-containing-gas discharge pipe 18 and the other end of the fuel-gas discharge pipe 6 are merged together, and the pressure-loss part 120 is provided. Accordingly, it is possible to increase the pressures of the anode-off gas and the cathode-off gas and to improve the output of the fuel cell stack 100. As described above, it is possible to provide a higher performance system with a simple configuration.

Second Embodiment

The fuel cell system 1 according to the present embodiment is different from the fuel cell system 1 according to the first embodiment in that a damper 215 is further provided in the external discharge pipe 20. Differences between the fuel cell system 1 according to the present embodiment and the fuel cell system 1 according to the first embodiment are described below.

Figure 5:
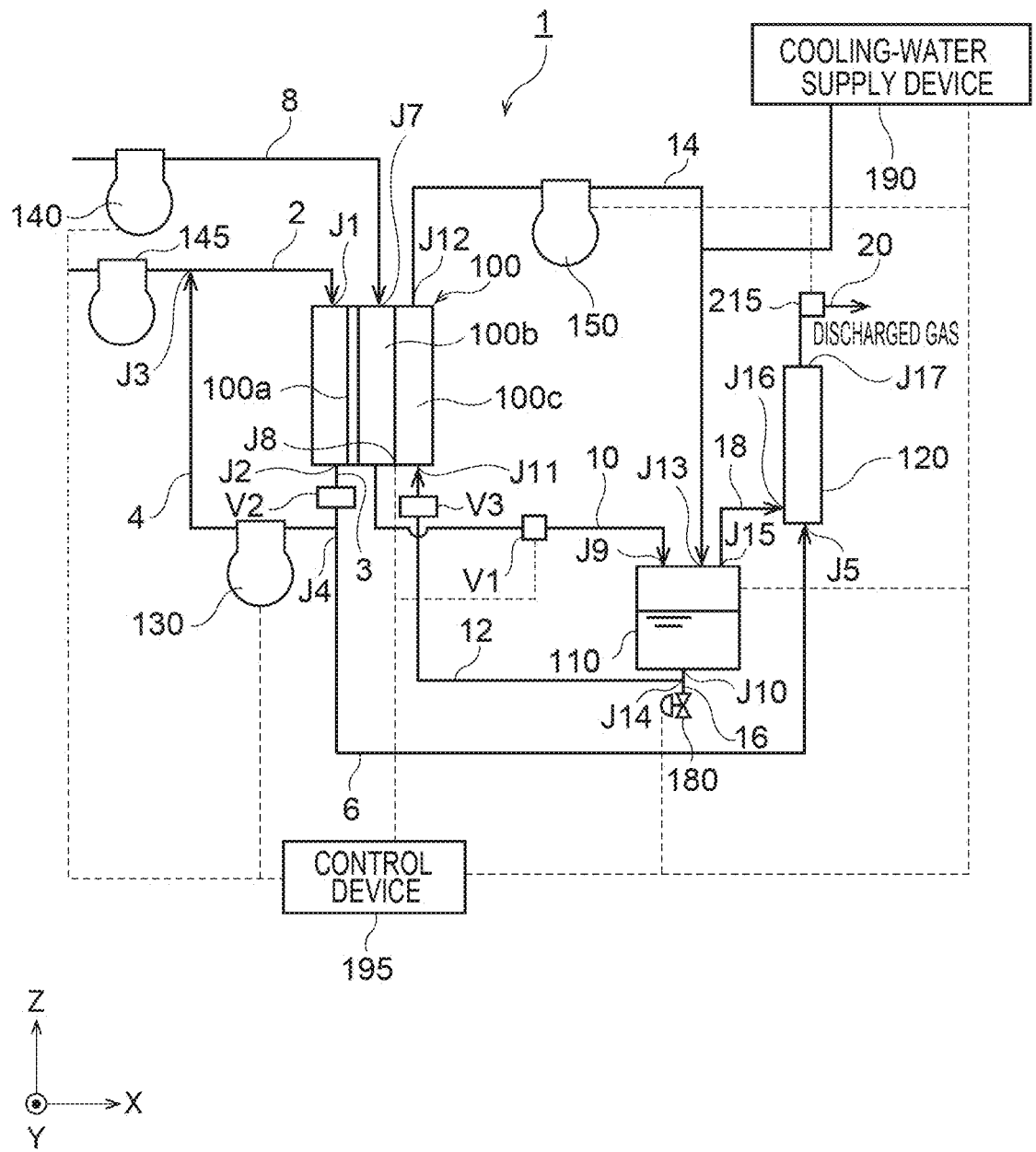
FIG. 5 is an overall schematic configuration diagram of a fuel cell system according to a second embodiment.

FIG. 5 is an overall schematic configuration diagram of the fuel cell system 1 according to a second embodiment. As illustrated in FIG. 5, the fuel cell system 1 according to the second embodiment further includes the damper 215.

The damper 215 adjusts pressure loss in the external discharge pipe 20. Accordingly, it is possible to adjust pressure increase of the air-pressure in the outlet J8 of the air outlet manifold 206 and the air-pressure in the outlet J2 of the fuel outlet manifold 202.

As described above, according to the present embodiment, the air-pressure in the cooling-water tank 110 is adjusted by means of the damper 215 provided in the external discharge pipe 20. Accordingly, it is possible to adjust the air-pressures in the discharge part J8 of the oxidizing-electrode passage 100b and in the outlet J2 of the fuel outlet manifold 202, while keeping the water-pressure of cooling water to be supplied to the inlet J11 of the cooling-water passage 100c lower than the pressure in the discharge part J8 of the oxidizing-electrode passage 100b.

While certain embodiments have been described, these embodiments have been presented by way of example only, and are not intended to limit the scope of the inventions. Indeed, the novel embodiments described herein may be embodied in a variety of other forms and various omissions, substitutions, and changes may be made without departing from the spirit of the inventions. The embodiments and their modifications are intended to be included in the scope and the spirit of the invention and also in the scope of the invention and their equivalents described in the claims.

The invention claimed is:

1. A fuel cell system comprising:
 a fuel cell provided with a fuel-electrode passage configured to supply a fuel gas to be supplied from a fuel-gas supply passage to a fuel electrode, an oxidizing-electrode passage configured to supply an oxygen-containing gas to an oxidizing electrode, and a cooling-water passage isolated from at least either the fuel-electrode passage or the oxidizing-electrode passage by a conductive porous material;
 a cooling-water tank having a cooling-water supply port to which a cooling-water supply pipe coupled at one end to a cooling-water inlet manifold provided in an upstream inlet of the cooling-water passage is coupled at the other end, a first oxygen-containing-gas discharge pipe coupled at one end to an air outlet manifold provided on a downstream side of the oxidizing-electrode passage being coupled to the cooling-water tank at the other end, the cooling-water tank being configured to supply cooling water from the cooling-water inlet manifold; and
 a pressure-loss part to which a second oxygen-containing-gas discharge pipe coupled at one end to an air discharge port of the cooling-water tank is coupled at the other end, and to which a fuel-gas discharge pipe coupled at one end to a fuel outlet manifold provided in a downstream outlet of the fuel-electrode passage is coupled at the other end.

2. The system of claim 1, wherein the pressure-loss part is any one of a heat exchanger, a sound absorbing duct, and a catalytic combustor.

3. The system of claim 2, further comprising a damper provided on a downstream side of the pressure-loss part and configured to adjust pressure loss in the pressure-loss part.

4. The system of claim 1, further comprising:
 a supply part provided in an oxygen-containing-gas supply pipe coupled to an air inlet manifold in an upstream inlet in the oxidizing-electrode passage and configured to supply the oxygen-containing gas; and
 a discharge part provided in a cooling-water discharge pipe coupled to a cooling-water outlet manifold in a downstream outlet in the cooling-water passage and configured to discharge cooling water from the cooling-water outlet manifold.

5. The system of claim 4, further comprising a control device configured to control at least a discharge amount of the cooling water from the discharge part based on a water-pressure in the cooling-water inlet manifold and an air-pressure in the air outlet manifold.

6. The system of claim 3, further comprising a control device configured to control the damper based on a water-pressure in the cooling-water inlet manifold and an air-pressure in the air outlet manifold.

7. A method for controlling a fuel cell system that includes a fuel cell provided with a fuel-electrode passage configured to supply a fuel gas to be supplied from a fuel-gas supply passage to a fuel electrode, an oxidizing-electrode passage configured to supply an oxygen-containing gas to an oxidizing electrode, and a cooling-water passage isolated from at least either the fuel-electrode passage or the oxidizing-electrode passage by a conductive porous material, a cooling-water tank having a cooling-water supply port to which a cooling-water supply pipe coupled at one end to a cooling-water inlet manifold provided in an upstream inlet of the cooling-water passage is coupled at the other end, a first oxygen-containing-gas discharge pipe coupled at one end to an air outlet manifold provided on a downstream side of the oxidizing-electrode passage being coupled to the cooling-water tank at the other end, the cooling-water tank being configured to supply cooling water from the cooling-water inlet manifold, and a pressure-loss part to which a second oxygen-containing-gas discharge pipe coupled at one end to an air discharge port of the cooling-water tank is coupled at the other end, and to which a fuel-gas discharge pipe coupled at one end to a fuel-outlet manifold provided in a downstream outlet of the fuel-electrode passage is coupled at the other end, the method comprising adjusting a differential pressure between a water-pressure in the cooling-water inlet manifold and an air-pressure in an air outlet manifold provided on a downstream side of the oxidizing-electrode passage by an amount of discharge from the cooling-water passage.

8. The method of claim 7, the fuel cell system further includes a supply part provided in an oxygen-containing-gas supply pipe coupled to an air inlet manifold in an upstream inlet in the oxidizing-electrode passage and configured to supply the oxygen-containing gas, and a discharge part provided in a cooling-water discharge pipe coupled to a cooling-water outlet manifold in a downstream outlet in the cooling-water passage and configured to discharge cooling water from the cooling-water outlet manifold, the method comprising controlling at least a discharge amount of the cooling water from the discharge part based on a water-pressure in the cooling-water inlet manifold and an air-pressure in the air outlet manifold.

9. The method of claim 7, the fuel cell system further includes a damper provided on a downstream side of the pressure-loss part and configured to adjust pressure loss in the pressure-loss part, the method comprising controlling the damper based on a water-pressure in the cooling-water inlet manifold and an air-pressure in the air outlet manifold.

10. The method of claim 7, comprising supplying the oxygen-containing gas from a supply part provided in an oxygen-containing-gas supply pipe coupled to an air inlet manifold in an upstream inlet in the oxidizing-electrode passage, and discharging cooling water from a cooling-water outlet manifold through a discharge part provided in a cooling-water discharge pipe coupled to the cooling-water outlet manifold in a downstream outlet in the cooling-water passage.

11. The method of claim 10, comprising controlling at least a discharge amount of the cooling water from the discharge part based on a water-pressure in the cooling-water inlet manifold and an air-pressure in the air outlet manifold.

* * * * *